United States Patent
Lee et al.

(10) Patent No.: US 10,180,253 B2
(45) Date of Patent: Jan. 15, 2019

(54) INTEGRATED CARBON DIOXIDE CONVERSION SYSTEM FOR CONNECTING OXYFUEL COMBUSTION AND CATALYTIC CONVERSION PROCESS

(71) Applicants: KOREA INSTITUTE OF MACHINERY & MATERIALS, Daejeon (KR); KOREA RESEARCH INSTITUTE OF CHEMICAL TECHNOLOGY, Daejeon (KR); KOREA INSTITUTE OF ENERGY RESEARCH, Daejeon (KR)

(72) Inventors: Kew-Ho Lee, Daejeon (KR); Kook-Young Ahn, Daejeon (KR); Sang Gyu Kang, Daejeon (KR); Young Duk Lee, Daejeon (KR); Tae Sun Chang, Daejeon (KR); Seung Eun Nam, Daejeon (KR); Ji Haeung Yu, Daejeon (KR); Jong Hoon Joo, Cheongwon-gun (KR)

(73) Assignees: KOREA INSTITUTE OF MACHINERY & MATERIALS, Daejeon (KR); KOREA RESEARCH INSTITUTE OF CHEMICAL TECHNOLOGY, Daejeon (KR); KOREA INSTITUTE OF ENERGY RESEARCH, Daejeon (KR)

(*) Notice: Subject to any disclaimer, the term of this patent is extended or adjusted under 35 U.S.C. 154(b) by 429 days.

(21) Appl. No.: 14/439,414

(22) PCT Filed: Sep. 30, 2013

(86) PCT No.: PCT/KR2013/008768
§ 371 (c)(1),
(2) Date: Apr. 29, 2015

(87) PCT Pub. No.: WO2014/069796
PCT Pub. Date: May 8, 2014

(65) Prior Publication Data
US 2015/0308676 A1    Oct. 29, 2015

(30) Foreign Application Priority Data
Oct. 31, 2012 (KR) .................. 10-2012-0122681
Oct. 31, 2012 (KR) .................. 10-2012-0122682

(51) Int. Cl.
*F23C 7/00* (2006.01)
*C01B 3/38* (2006.01)
(Continued)

(52) U.S. Cl.
CPC ............. *F23C 7/00* (2013.01); *B01D 53/62* (2013.01); *B01J 12/007* (2013.01);
(Continued)

(58) Field of Classification Search
CPC ..... Y02P 20/52; Y02P 20/152; H01M 8/0612; C01B 13/0251
See application file for complete search history.

(56) References Cited

U.S. PATENT DOCUMENTS 5,312,843 A    5/1994 Yamauchi
5,714,657 A *  2/1998 deVries ............... C07C 1/0485
                                                  518/702
(Continued)

FOREIGN PATENT DOCUMENTS

DE    10 2007 060929    6/2008
JP    05-270802         10/1993
(Continued)

OTHER PUBLICATIONS

European Patent Office, Extended European search report of Application No. 13850853.6, dated Jan. 4, 2017.
(Continued)

*Primary Examiner* — Imran Akram
(74) *Attorney, Agent, or Firm* — Lex IP Meister, PLLC

(57) ABSTRACT

A carbon dioxide conversion system is provided. The carbon dioxide conversion system includes: an ion transfer membrane that separates oxygen in the air; an oxy-fuel combustor that combusts using oxygen that is separated at the ion transfer membrane as an oxidizing agent; and a dry-reformer that converts carbon dioxide that is generated through an oxy-fuel combustion reaction of the oxy-fuel combustor and methane gas that is supplied from the outside to carbon monoxide and hydrogen by a dry-reforming reaction.

6 Claims, 9 Drawing Sheets

(51) Int. Cl.
 *C01B 13/02* (2006.01)
 *B01D 53/62* (2006.01)
 *F23J 15/06* (2006.01)
 *F23L 7/00* (2006.01)
 *B01J 12/00* (2006.01)
 *B01J 19/24* (2006.01)

(52) U.S. Cl.
 CPC ........... *B01J 19/2475* (2013.01); *C01B 3/38* (2013.01); *C01B 13/0251* (2013.01); *F23J 15/06* (2013.01); *F23L 7/007* (2013.01); *B01D 2251/208* (2013.01); *B01D 2256/12* (2013.01); *B01D 2257/102* (2013.01); *B01D 2257/504* (2013.01); *B01D 2257/80* (2013.01); *B01J 2219/00103* (2013.01); *C01B 2203/0238* (2013.01); *F23J 2215/50* (2013.01); *Y02A 50/2341* (2018.01); *Y02C 10/04* (2013.01); *Y02E 20/326* (2013.01); *Y02E 20/344* (2013.01); *Y02E 20/363* (2013.01); *Y02P 20/152* (2015.11); *Y02P 20/52* (2015.11)

(56) References Cited

U.S. PATENT DOCUMENTS

| | | | |
|---|---|---|---|
| 5,888,272 | A | 3/1999 | Prasad |
| 5,976,223 | A | 11/1999 | Prasad |
| 6,149,714 | A | 11/2000 | Kobayashi |
| 6,312,660 | B1 | 11/2001 | Yagi |
| 6,340,437 | B1 | 1/2002 | Yagi |
| 6,376,423 | B2 | 4/2002 | Yagi |
| 6,382,958 | B1 | 5/2002 | Bool |
| 6,706,434 | B2 | 3/2004 | Takamura |
| 7,802,434 | B2 | 9/2010 | Varatharajan |
| 8,075,746 | B2 | 12/2011 | Hartvigsen |
| 8,486,167 | B2 | 7/2013 | Okada |
| 8,986,405 | B2 | 3/2015 | Modarresi |
| 9,162,888 | B2 | 10/2015 | Okada |
| 2004/0105812 | A1* | 6/2004 | Tonkovich ............. B01J 12/007 423/650 |
| 2005/0166456 | A1* | 8/2005 | Brundage ............. B01J 12/007 48/198.7 |
| 2006/0029539 | A1* | 2/2006 | Dutta ...................... B01J 8/009 423/651 |
| 2008/0141643 | A1 | 6/2008 | Varatharajan |
| 2009/0261587 | A1* | 10/2009 | Lomax ...................... H02J 3/42 290/7 |
| 2010/0186824 | A1* | 7/2010 | Bowe .......................... B01J 8/02 137/2 |
| 2012/0043219 | A1 | 2/2012 | Hartvigsen |
| 2012/0048730 | A1 | 3/2012 | Hartvigsen |
| 2012/0129110 | A1 | 5/2012 | Siljan |
| 2013/0009102 | A1* | 1/2013 | Kelly ...................... C01B 3/384 252/373 |
| 2013/0084221 | A1* | 4/2013 | Kelly ...................... C01B 3/384 422/162 |
| 2015/0073188 | A1* | 3/2015 | Floudas ................. C10G 35/00 585/332 |

FOREIGN PATENT DOCUMENTS

| | | |
|---|---|---|
| JP | 09-25101 | 1/1997 |
| JP | 11-43303 | 2/1999 |
| JP | 11-221421 | 8/1999 |
| JP | 2000-304206 | 11/2000 |
| JP | 2001-229953 | 8/2001 |
| JP | 2001-302210 | 10/2001 |
| JP | 2002-122306 | 4/2002 |
| JP | 2002-187703 | 7/2002 |
| JP | 2003-183202 | 7/2003 |
| JP | 2008-180213 | 8/2008 |
| JP | 2009-506213 | 2/2009 |
| JP | 2009-286666 | 12/2009 |
| JP | 2011-181490 | 9/2011 |
| KR | 10-1067509 | 9/2011 |
| WO | 1998/046524 | 10/1998 |
| WO | 2006/001438 | 1/2006 |
| WO | 2011-061764 | 5/2011 |

OTHER PUBLICATIONS

Aboosad, Z. Arab, et al., Applied Energy, "Optimization of tri-reformer reactor to produce synthesis gas for methanol production using differential evolution (DE) method", vol. 88, issue 8, pp. 2691-2701, Aug. 31, 2011.

Itkulov A, Sh. S., et al., Bull. Korean Chem. Soc "C02 Reforming of Methane over Co—PdlA1203 Catalysts", vol. 26, No. 12, pp. 2017-2020, Dec. 20, 2005.

N. D. Mancini and A. Mitsos, Phys. Chem. Chem. Phys., "Conceptual design and analysis of ITM oxy-combustion power cycles", 2011, 13, 21351-21361.

* cited by examiner

INTEGRATED CARBON DIOXIDE CONVERSION SYSTEM FOR CONNECTING OXYFUEL COMBUSTION AND CATALYTIC CONVERSION PROCESS

TECHNICAL FIELD

The present invention relates to a carbon dioxide conversion system. More particularly, the present invention relates to an integrated carbon dioxide conversion system for connecting oxy-fuel combustion and a catalytic conversion process.

BACKGROUND ART

Oxy-fuel combustion technology is technology that easily performs collection of carbon dioxide by injecting and combusting oxygen-fuel that removes a nitrogen component occupying about 79% of air instead of using existing combustion air in an existing air combustion method that is injected into a combustor without removing nitrogen and other components in the air. In technology that recovers carbon dioxide by adapting oxy-fuel combustion, by combusting using a high concentration of oxygen having purity of 95% or more instead of air as an oxidizing agent, heat is generated. Most of exhaust gas that is generated through oxy-fuel combustion is formed of carbon dioxide and steam, and by recirculating about 70-80% of the generated exhaust gas to a combustion chamber, a concentration of carbon dioxide of the exhaust gas may be finally concentrated to 80% or more. In the oxy-fuel combustion technology, when condensing steam as a main component of the discharged exhaust gas, almost an entire amount of carbon dioxide may be recovered, and by storing the recovered carbon dioxide, carbon dioxide and an air pollution material are not discharged.

As described above, a carbon dioxide conversion system collects a high concentration of carbon dioxide. However, for oxy-fuel combustion, a high concentration of oxygen is required, and in this case, when separating oxygen from the air using an Air Separation Unit (ASU), much energy is consumed and thus there is a drawback that entire system efficiency is lowered.

Further, in a conventional system, the system is used for collecting, transporting, and storing a high concentration of carbon dioxide that is discharged through oxy-fuel combustion and thus there is a problem that a use value is deteriorated.

Further, a conventional oxy-fuel combustor uses oxygen as an oxidizing agent and a single flame temperature is high compared with when using air, and as a combustor outer wall may be damaged thereby, in order to reduce the combustion temperature, steam is injected. In this case, there is a problem that a heat source for generating steam should exist and separate pump work for driving the steam is needed.

DISCLOSURE

Technical Problem

The present invention is suggested to solve the above problem, and provides an integrated carbon dioxide conversion system that connects oxy-fuel combustion and a catalyst conversion process and includes an Ion Transfer Membrane (ITM) that separates oxygen in the air, an oxy-fuel combustor that combusts using oxygen that is separated at the ITM as an oxidizing agent, a reformer that converts a high concentration of carbon dioxide that is generated through an oxy-fuel combustion reaction to synthetic gases CO and $H_2$, and a synthesizer that converts the synthetic gases to methanol.

A carbon dioxide conversion system further including a co-electrolysis device that converts carbon dioxide and steam to a synthetic gas by applying heat and electrical energy and that connects co-electrolysis and catalyst conversion processes using oxy-fuel combustion and new reproduction energy is provided.

Further, a carbon dioxide conversion system that converts collected carbon dioxide to a new fuel or a useful compound is provided.

A carbon dioxide conversion system that can increase a life-span of an oxy-fuel combustor and that can improve a conversion rate of a reforming reaction by providing an integral reactor that integrates a reformer at an outer wall of the oxy-fuel combustor is provided.

Technical Solution

An exemplary embodiment of the present invention provides a carbon dioxide conversion system including: an ion transfer membrane that separates oxygen in the air; an oxy-fuel combustor that combusts using oxygen that is separated at the ion transfer membrane as an oxidizing agent; and a dry-reformer that converts carbon dioxide that is generated through an oxy-fuel combustion reaction of the oxy-fuel combustor and methane gas that is supplied from the outside to carbon monoxide and hydrogen by a dry-reforming reaction.

The carbon dioxide conversion system may further include a co-electrolysis device that converts carbon dioxide and steam that are generated through an oxy-fuel combustion reaction of the oxy-fuel combustor by applying heat and electrical energy to carbon monoxide, hydrogen, and oxygen. The carbon dioxide conversion system may further include a synthesizer that converts carbon monoxide and hydrogen that are generated in the dry-reformer or the co-electrolysis device to methanol, ketone, or carbonate.

The carbon dioxide conversion system may further include a mixer that mixes oxygen that is generated in the co-electrolysis device and oxygen that is separated at the ion transfer membrane, wherein oxygen may be supplied from the mixer to the oxy-fuel combustor.

Another embodiment of the present invention provides a carbon dioxide conversion system including: an ion transfer membrane that separates oxygen in the air; an oxy-fuel combustor that combusts using oxygen that is separated at the ion transfer membrane as an oxidizing agent; and a tri-reformer that converts carbon dioxide and steam that are generated through an oxy-fuel combustion reaction of the oxy-fuel combustor, methane gas that is supplied from the outside, and oxygen that is separated at the ion transfer membrane to carbon monoxide and hydrogen by a tri-reforming reaction.

The carbon dioxide conversion system may further include a co-electrolysis device that converts carbon dioxide and steam that are generated through an oxy-fuel combustion reaction of the oxy-fuel combustor by applying heat and electrical energy to carbon monoxide, hydrogen, and oxygen.

The carbon dioxide conversion system may further include a synthesizer that converts carbon monoxide and hydrogen that are generated in the tri-reformer or the co-electrolysis device to methanol, ketone, or carbonate.

The carbon dioxide conversion system may further include: a mixer that mixes oxygen that is generated in the co-electrolysis device and oxygen that is separated at the ion transfer membrane; and a 3-way valve that supplies oxygen from the mixer to the oxy-fuel combustor or the tri-reformer.

A turbine may be rotated using exhaust gas that is discharged from the oxy-fuel combustor, and electricity may be generated through a generator that is connected to the turbine.

A first heat exchanger may be located at the rear end of the oxy-fuel combustor to raise the temperature of a circulating fluid.

Steam may be separated from the exhaust gas having passed through the turbine to be supplied to the oxy-fuel combustor.

Steam may be separated from exhaust gas that is discharged from the oxy-fuel combustor to be supplied to the tri-reformer and the oxy-fuel combustor.

The carbon dioxide conversion system may further include a 3-way valve that adjusts a flow rate of steam that is supplied to the tri-reformer and the oxy-fuel combustor.

Yet another embodiment of the present invention provides a carbon dioxide conversion system including: an ion transfer membrane that separates oxygen in the air; and an integral reactor that includes a dry-reformer at an outer wall of an oxy-fuel combustor, wherein at the oxy-fuel combustor of the integral reactor, a combustion reaction occurs using oxygen that is separated at the ion transfer membrane as an oxidizing agent, and the dry-reformer of the integral reactor converts carbon dioxide that is generated through an oxy-fuel combustion reaction of the oxy-fuel combustor and methane gas that is supplied from the outside to carbon monoxide and hydrogen with a dry-reforming reaction.

The carbon dioxide conversion system may further include a co-electrolysis device that converts carbon dioxide and steam that are generated through an oxy-fuel combustion reaction of the oxy-fuel combustor by applying heat and electrical energy to carbon monoxide, hydrogen, and oxygen.

The carbon dioxide conversion system may further include a synthesizer that converts carbon monoxide and hydrogen that are generated in the dry-reformer or the co-electrolysis device to methanol, ketone, or carbonate.

The carbon dioxide conversion system may further include a mixer that mixes oxygen that is generated in the co-electrolysis device and oxygen that is separated at the ion transfer membrane, wherein oxygen may be supplied from the mixer to the oxy-fuel combustor.

Yet another embodiment of the present invention provides a carbon dioxide conversion system including: an ion transfer membrane that separates oxygen in the air; and an integral reactor that includes a tri-reformer at an outer wall of an oxy-fuel combustor, wherein at the oxy-fuel combustor of the integral reactor, a combustion reaction occurs using oxygen that is separated at the ion transfer membrane as an oxidizing agent, and the tri-reformer of the integral reactor converts carbon dioxide and steam that are generated through an oxy-fuel combustion reaction of the oxy-fuel combustor, methane gas that is supplied from the outside, and oxygen that is separated at the ion transfer membrane to carbon monoxide and hydrogen with a tri-reforming reaction.

The carbon dioxide conversion system may further include a co-electrolysis device that converts carbon dioxide and steam that are generated through an oxy-fuel combustion reaction of the oxy-fuel combustor by applying heat and electrical energy to carbon monoxide, hydrogen, and oxygen.

The carbon dioxide conversion system may further include a synthesizer that converts carbon monoxide and hydrogen that are generated in the tri-reformer or the co-electrolysis device to methanol, ketone, or carbonate.

The carbon dioxide conversion system may further include: a mixer that mixes oxygen that is generated in the co-electrolysis device and oxygen that is separated at the ion transfer membrane; and a 3-way valve that supplies oxygen from the mixer to the oxy-fuel combustor or the tri-reformer.

A turbine may be rotated using exhaust gas that is discharged from the oxy-fuel combustor, and electricity may be generated through a generator that is connected to the turbine.

The carbon dioxide conversion system may further include a 3-way valve that separates steam from exhaust gas that is discharged from the oxy-fuel combustor to supply the steam to the oxy-fuel combustor and that adjusts a flow rate of the steam.

Steam may be separated from exhaust gas that is discharged from the oxy-fuel combustor to be supplied to the tri-reformer and the oxy-fuel combustor.

The carbon dioxide conversion system may further include a 3-way valve that adjusts a flow rate of steam that is supplied to the tri-reformer and the oxy-fuel combustor.

Advantageous Effects

According to a carbon dioxide conversion system of the present invention, from an oxygen production viewpoint, compared with an ASU that separates oxygen in the air using an ITM, oxygen production cost is reduced and thus system efficiency is improved.

Because a synthetic gas that is converted in a reformer can be converted and synthesized to a useful compound material or a new fuel such as methanol, ketone, or carbonate via an additional process, there is a merit that the system can have various uses.

In a carbon dioxide conversion system according to the present invention, by integrating and producing a tri-reformer or a dry-reformer at an outer wall of an oxy-fuel combustor, heat that may damage the outer wall of the oxy-fuel combustor may be transferred to the tri-reformer or the dry-reformer and thus inflow of steam is unnecessary or a quantity thereof may be reduced such that energy consumption for generating and driving steam can be reduced.

Further, by improving a transfer rate of heat that is supplied to the tri-reformer or the dry-reformer, a synthetic gas conversion rate can be improved.

In addition, a synthetic gas can be converted and synthesized to a new fuel or useful compound material using midnight power or surplus power and heat energy from new reproduction energy and thus the carbon dioxide conversion system can have various uses.

MODE FOR INVENTION

Figure 1:
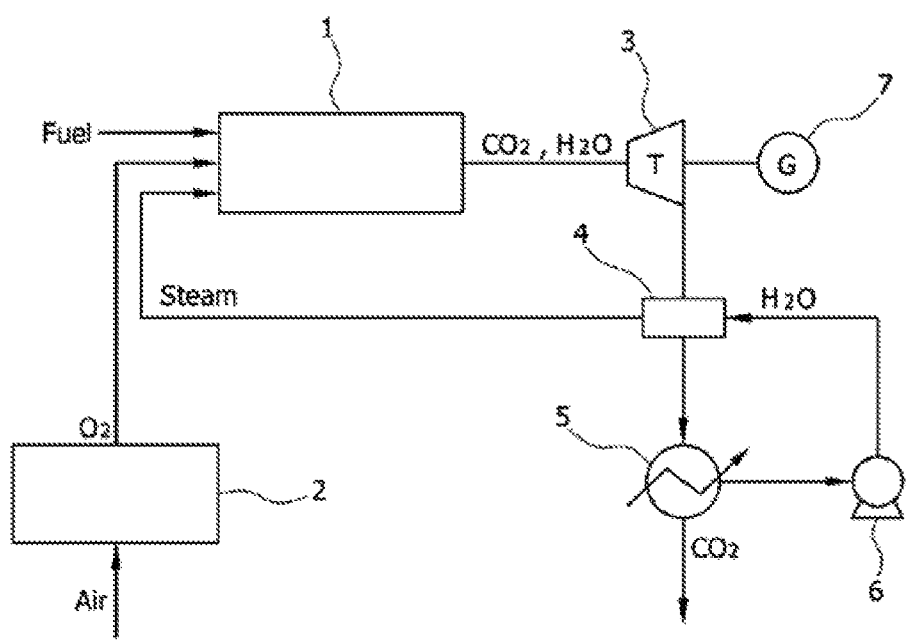
FIG. 1 is a schematic diagram of an oxy-fuel combustion system using a conventional ASU.

Hereinafter, exemplary embodiments of an integrated carbon dioxide conversion system that connects oxy-fuel combustion and a catalyst conversion process or that connects co-electrolysis and catalyst conversion processes using oxy-fuel combustion and new reproduction energy according to the present invention will be described in detail with reference to the accompanying drawings. Like reference numerals designate like elements throughout the specification. Further, detailed descriptions of well-known functions and structures incorporated herein may be omitted to avoid obscuring the subject matter of the present invention.

FIG. 1 is a diagram illustrating an oxy-fuel combustion system using a conventional ASU, and the system includes an oxy-fuel combustor 1, an ASU 2, a turbine 3, a heat exchanger 4, a heater 5, an air blower 6, and a generator 7.

In the oxy-fuel combustor 1, by using separated oxygen as an oxidizing agent, a combustion reaction occurs, and main components of exhaust gas that is discharged from the oxy-fuel combustor 1 are carbon dioxide and steam. The turbine 3 is driven using an exhaust gas, and the generator 7 that is connected to the same shaft as the turbine 3 generates electricity.

The exhaust gas, having passed through the turbine 3, is separated into carbon dioxide and steam by the heater 5, and the separated steam is sent to the heat exchanger 4 by the air blower 6. High temperature steam, having passed through the heat exchanger 4, is again recirculated to the oxy-fuel combustor 1.

The foregoing conventional system uses the ASU 2 that separates oxygen in injected air, and in a process of separating oxygen, energy is consumed and thus there is a problem that entire system efficiency is problematic.

Further, in an oxy-fuel combustion reaction, by using oxygen instead of air as an oxidizing agent, a single flame temperature is high and thus there is a problem that steam should be supplied to the oxy-fuel combustor 1 and that durability of the oxy-fuel combustor 1 is deteriorated.

Figure 2:
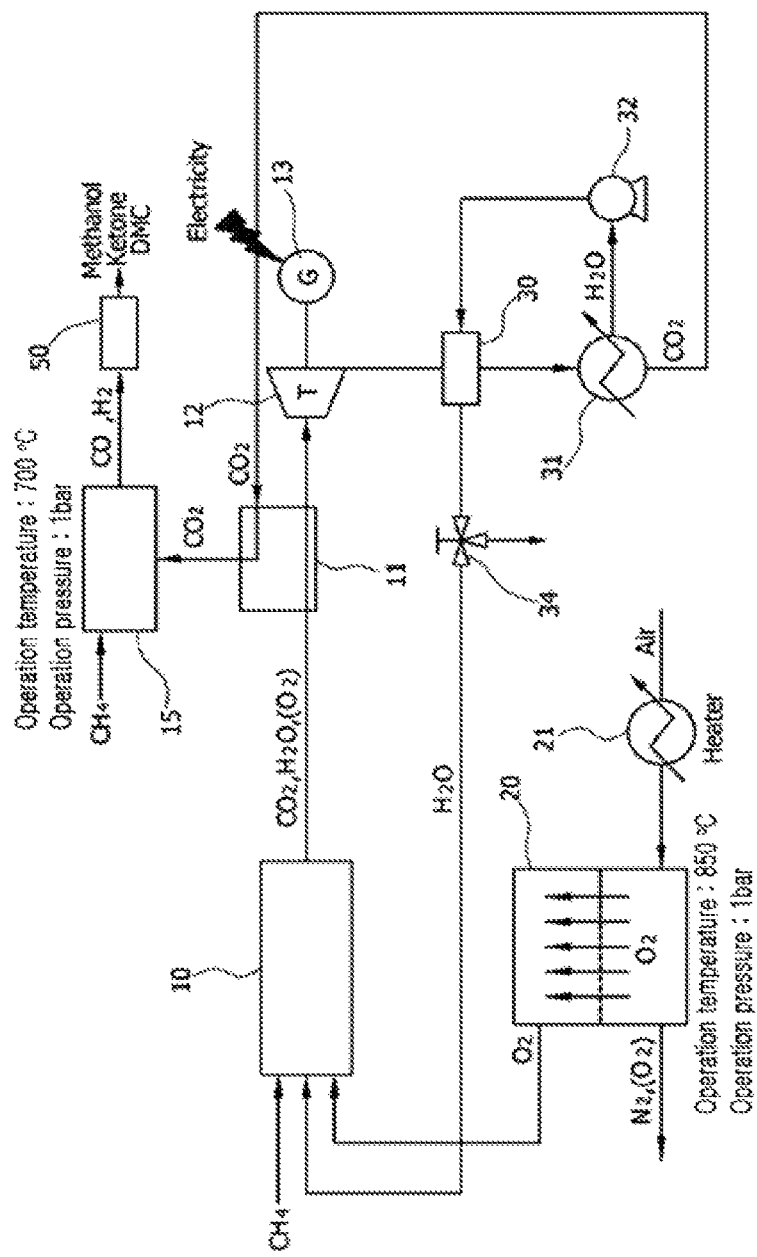
FIGS. 2 to 9 are schematic diagrams of an integrated carbon dioxide conversion system that connects oxy-fuel combustion and a catalyst conversion process or that connects co-electrolysis and catalyst conversion processes using oxy-fuel combustion and new reproduction energy according to an exemplary embodiment of the present invention.

FIG. 2 is a diagram illustrating a configuration of a system according to a first exemplary embodiment of the present invention.

[Exemplary Embodiment 1]

The system of the first exemplary embodiment includes an ITM 20 that separates oxygen in the air, an oxy-fuel combustor 10 that combusts using oxygen that is separated at the ITM 20 as an oxidizing agent, a dry-reformer 15 that converts a high concentration of carbon dioxide that is generated through an oxy-fuel combustion reaction to synthetic gases CO and $H_2$, and a synthesizer 50 that converts a synthetic gas to methanol.

In the ITM 20, a reaction temperature of oxygen separation is about 850° C. and an operation pressure thereof is about 1 bar, and a method of raising a temperature of supplied air by passing it through a separate heat exchanger or installing a heater 21 at the outside of the ITM 20 may be used.

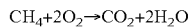

$$CH_4 + 2O_2 \rightarrow CO_2 + 2H_2O \qquad \text{Equation 1}$$

An oxy-fuel combustion reaction is a reaction of Equation 1, and when a natural gas $CH_4$ that is supplied from the outside to the oxy-fuel combustor 10, oxygen that is separated at the ITM 20, and steam $H_2O$ that is separated from exhaust gas of the oxy-fuel combustor 10 to be circulated are injected into the oxy-fuel combustor 10 to perform a combustion reaction, carbon dioxide and steam are generated as an exhaust gas.

The discharged exhaust gas drives a turbine 12 via a first heat exchanger 11, and a generator 13 that is connected to the same shaft as the turbine 12 generates electricity. The exhaust gas having passed through the turbine 12 passes through a second heat exchanger 30, and the exhaust gas having passed through the second heat exchanger 30 is separated into carbon dioxide and steam by a heater 31.

A temperature of the separated carbon dioxide is raised in the first heat exchanger 11, and the separated carbon dioxide is supplied to the dry-reformer 15. Further, the separated steam is sent to the second heat exchanger 30 by an air blower 32, and a temperature thereof is raised in the second heat exchanger 30, and thus the separated steam is supplied to the oxy-fuel combustor 10. In order to adjust a quantity of steam that is supplied to the oxy-fuel combustor 10, a 3-way valve 34 may be attached. The 3-way valve 34 adjusts a quantity of steam that is injected into the oxy-fuel combustor 10, thereby performing a function of adjusting system efficiency.

The dry-reformer 15 has an operation temperature of about 700° C. and an operation pressure of 1 bar, and as described above, carbon dioxide is separated and circulated from exhaust gas that is discharged from the oxy-fuel combustor 10, the temperature of the carbon dioxide is raised in the first heat exchanger 11, and the carbon dioxide is supplied to the dry-reformer 15.

In the present exemplary embodiment, a dry-reforming reaction of Equation 2 occurs.

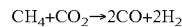

$$CH_4 + CO_2 \rightarrow 2CO + 2H_2 \qquad \text{Equation 2}$$

The dry-reforming reaction of Equation 2 is a reaction that receives supply of 1 mole of methane and 1 mole of carbon dioxide to generate 2 moles of carbon monoxide and 2 moles of hydrogen after a reforming reaction. The dry-reformer 15 generates carbon monoxide and hydrogen using a natural gas from the outside and carbon dioxide that is generated in an oxy-fuel combustion reaction.

Carbon monoxide and hydrogen that are generated in the dry-reformer 15 may be converted and synthesized into a useful chemical material or a new fuel such as methanol, ketone, or carbonate via the synthesizer 50.

The synthesizer 50 may be installed at the rear end of the dry-reformer 15.

Figure 3:
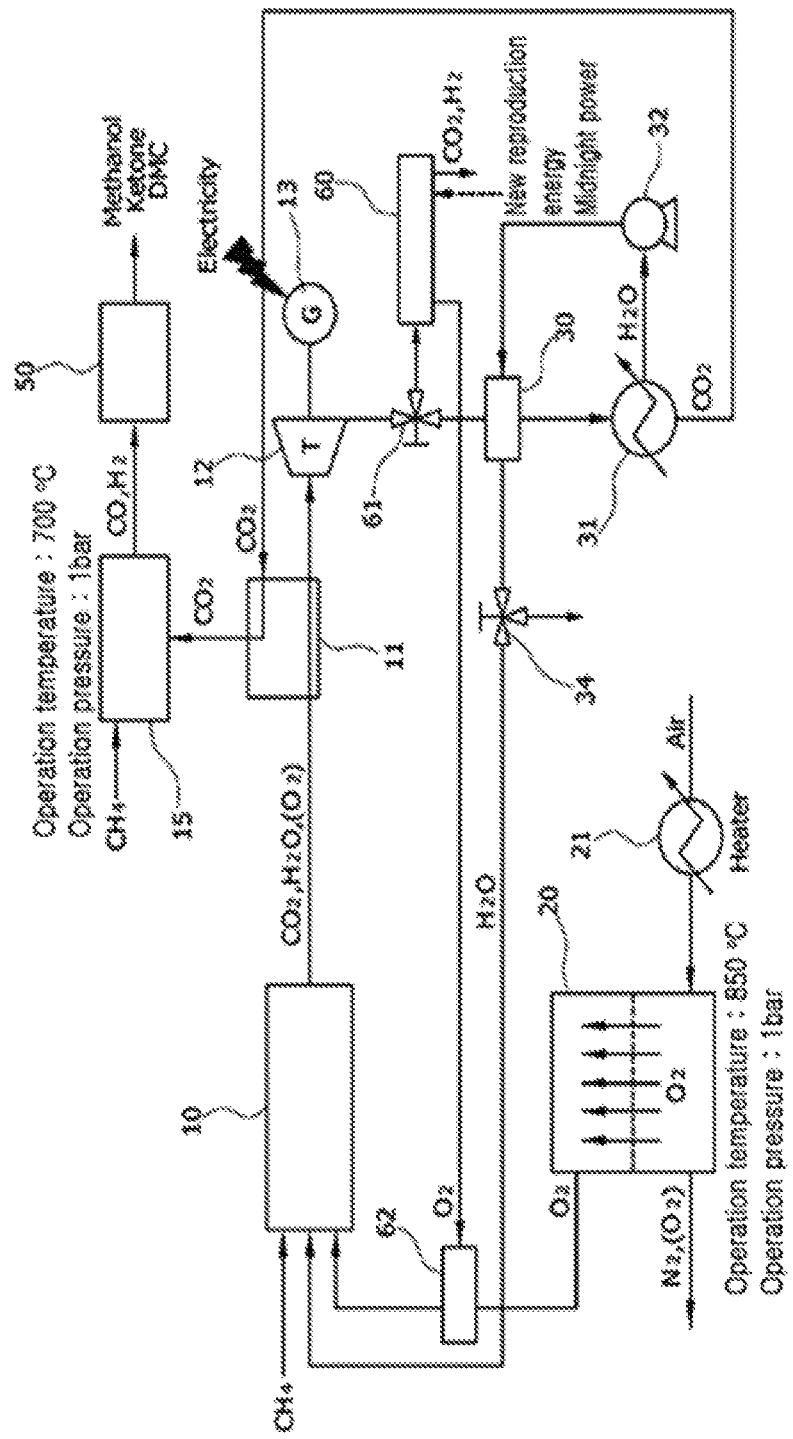

FIG. 3 is a diagram illustrating a configuration of a system according to a second exemplary embodiment of the present invention.

[Exemplary Embodiment 2]

The system of the second exemplary embodiment further includes a co-electrolysis device 60 that converts carbon dioxide and steam to a synthetic gas and oxygen by applying heat and electrical energy in the foregoing first exemplary embodiment.

An exhaust gas that is formed with steam and carbon dioxide that are discharged from an oxy-fuel combustor 10 drives a turbine 12 via a first heat exchanger 11, and the generator 13 that is connected to the same shaft as the turbine 12 generates electricity. An exhaust gas having passed through the turbine 12 is branched to flow while advancing through a 3-way valve 61 to a second heat exchanger 30 and flow while advancing to the co-electrolysis device 60.

The flow advancing to the co-electrolysis device 60 goes through a co-electrolysis process in which carbon dioxide and steam of an exhaust gas are electrolyzed together to be converted into a synthetic gas and oxygen. A co-electrolysis process is a process of converting to a synthetic gas and oxygen by applying heat and electrical energy. As described above, in a co-electrolysis process, because heat and electrical energy are required, midnight power or surplus power and thermal energy from new reproduction energy may be used.

When midnight power is used, in the daytime, conversion to carbon dioxide is performed only with a catalyst chemical process such as a dry-reforming reaction or a tri-reforming reaction, and in the night time, surplus power is available, so carbon dioxide and steam corresponding to a quantity of the surplus power are supplied to the co-electrolysis device 60 to generate a synthetic gas and oxygen.

Power from new reproduction energy such as wind power and sun power may perform a co-electrolysis process with the same method as a method using midnight electricity. In this way, when the co-electrolysis device 60 is used, wasted power may be used and in addition to a synthetic gas as a product, and oxygen is additionally produced and thus a quantity of oxygen that should be produced in the ITM 20 may be reduced such that energy that is consumed in the ITM 20 may be relatively reduced.

Oxygen that is generated in the co-electrolysis device 60 is mixed with oxygen that is separated at the ITM 20 in a mixer 62 to be supplied to the oxy-fuel combustor 10.

Carbon monoxide and hydrogen that are generated in the dry-reformer 15 or the co-electrolysis device 60 may be converted and synthesized into a useful chemical material or a new fuel such as methanol, ketone, or carbonate via the synthesizer 50.

The synthesizer 50 may be installed at the rear end of the dry-reformer 15 or the co-electrolysis device 60.

Figure 4:
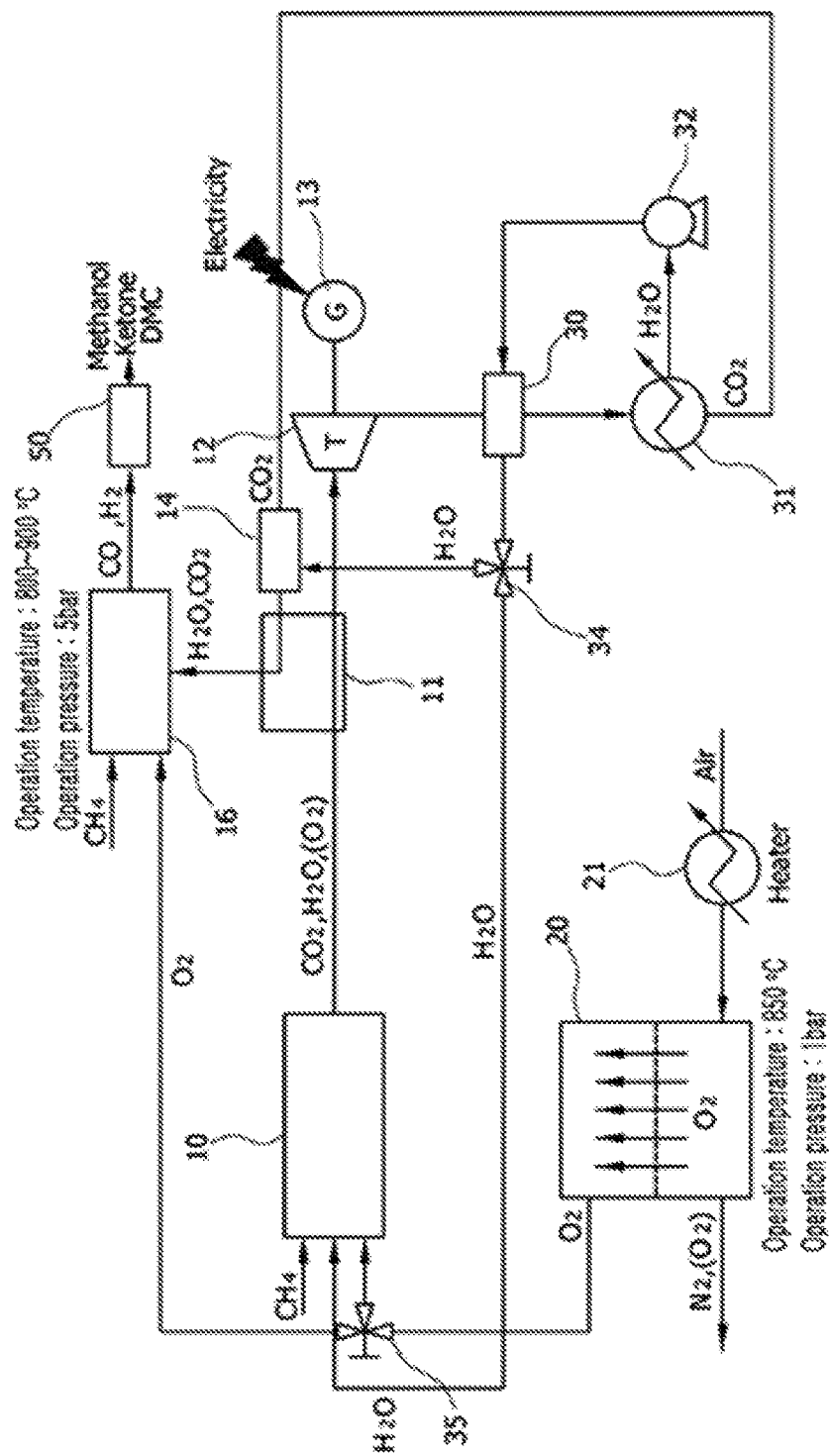

FIG. 4 is a diagram illustrating a configuration of a system according to a third exemplary embodiment of the present invention.

[Exemplary Embodiment 3]

The system of the third exemplary embodiment includes an ITM 20 that separates oxygen in the air, an oxy-fuel combustor 10 that combusts using oxygen that is separated at the ITM 20 as an oxidizing agent, a tri-reformer 16 that converts a high concentration of carbon dioxide and steam that are generated through an oxy-fuel combustion reaction, a natural gas that is supplied from the outside, oxygen that is separated at the ITM 20 to synthetic gases CO and $H_2$, and a synthesizer 50 that converts a synthetic gas to methanol.

Unlike the first and second exemplary embodiments, in the third exemplary embodiment, a tri-reforming reaction is performed and is represented as in Equation 3.

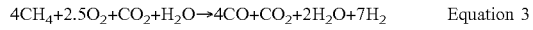

$$4CH_4+2.5O_2+CO_2+H_2O \rightarrow 4CO+CO_2+2H_2O+7H_2 \qquad \text{Equation 3}$$

The tri-reforming reaction should additionally inject oxygen and steam, unlike a dry-reforming reaction that injects only carbon dioxide and natural gas.

Therefore, in order to inject oxygen, oxygen that is separated at the ITM 20 is adjusted to be injected into the oxy-fuel combustor 10 or the tri-reformer 16 by a 3-way valve 35.

In the oxy-fuel combustor 10, after an oxy-fuel combustion reaction of Equation 1 is performed, a discharged exhaust gas is moved to a first heat exchanger 11. The exhaust gas having passed through the first heat exchanger 11 drives a turbine 12, and a generator 13 that is connected to the same shaft as the turbine 12 generates electricity.

The exhaust gas having passed through the turbine 12 again passes through a second heat exchanger 30, and the exhaust gas having passed through the second heat exchanger 30 is separated into carbon dioxide and steam by a heater 31. The separated steam is injected into the second heat exchanger 30 by an air blower 32, and after the temperature thereof is raised at the second heat exchanger 30, flow of the separated steam is adjusted from the 3-way valve 34 in a direction of the oxy-fuel combustor 10 or in a direction of the tri-reformer 16.

Steam flowing from the 3-way valve 34 in a direction of the tri-reformer 16 is injected into a mixer 14, and in the mixer 14, the steam is mixed with carbon dioxide that is separated at the heater 31 and the temperature thereof is raised at the first heat exchanger 11, and the steam is supplied to the tri-reformer 16.

The tri-reformer 16 has an operation temperature of about 800-900° C. and an operation pressure of 5 bar, and is operated at a higher temperature and pressure than the dry-reformer 15 that is described in the first and second exemplary embodiments, and in the first heat exchanger 11, after the temperature of steam and carbon dioxide are fully raised, the steam and carbon dioxide should be supplied to the tri-reformer 16.

A temperature of oxygen that is separated at the ITM 20 approximately corresponds to 850° C., which is a reaction temperature of tri-reforming, and oxygen may be supplied without passing through a heat exchanger.

Carbon monoxide and hydrogen that are generated in the tri-reformer 16 may be converted and synthesized into a useful chemical material or a new fuel such as methanol, ketone, or carbonate via the synthesizer 50.

Figure 5:
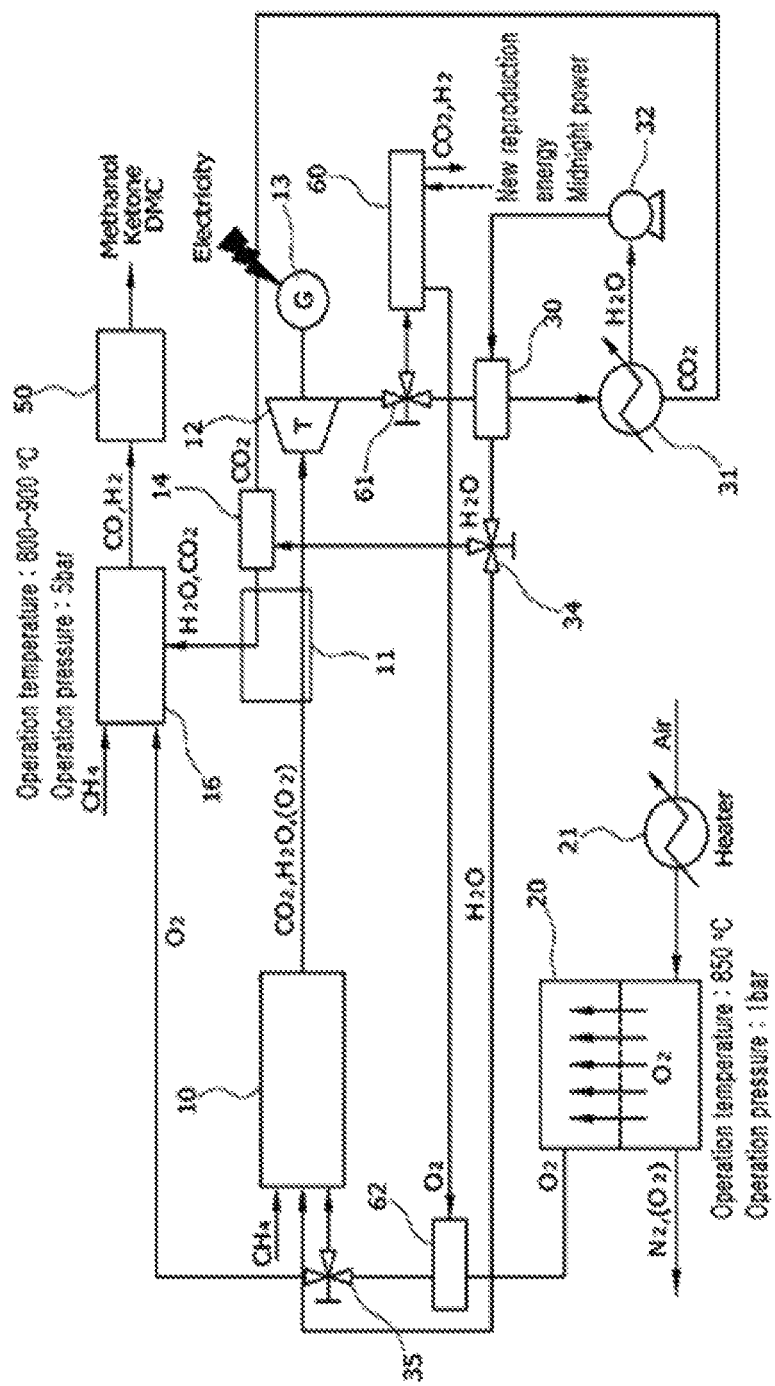

FIG. 5 is a diagram illustrating a configuration of a system according to a fourth exemplary embodiment of the present invention.

[Exemplary Embodiment 4]

The system of the fourth exemplary embodiment further includes a co-electrolysis device 60 that converts carbon dioxide and steam to a synthetic gas and oxygen by applying heat and electrical energy in the foregoing third exemplary embodiment.

An exhaust gas, having passed through a turbine 12 is branched to flow while advancing through a 3-way valve 61 to a second heat exchanger 30 and flow while advancing to the co-electrolysis device 60.

The flow while advancing to the co-electrolysis device 60 goes through a co-electrolysis process in which carbon dioxide and steam of exhaust gas are electrolyzed together to be converted into a synthetic gas and oxygen.

Oxygen that is generated in the co-electrolysis device 60 is mixed with oxygen that is separated at an ITM 20 in a mixer 62, and is supplied to an oxy-fuel combustor 10 or a tri-reformer 16 by a 3-way valve 35.

Carbon monoxide and hydrogen that are generated in the tri-reformer 16 or the co-electrolysis device 60 may be converted and synthesized into a useful chemical material or a new fuel such as methanol, ketone, or carbonate via a synthesizer 50.

Figure 6:
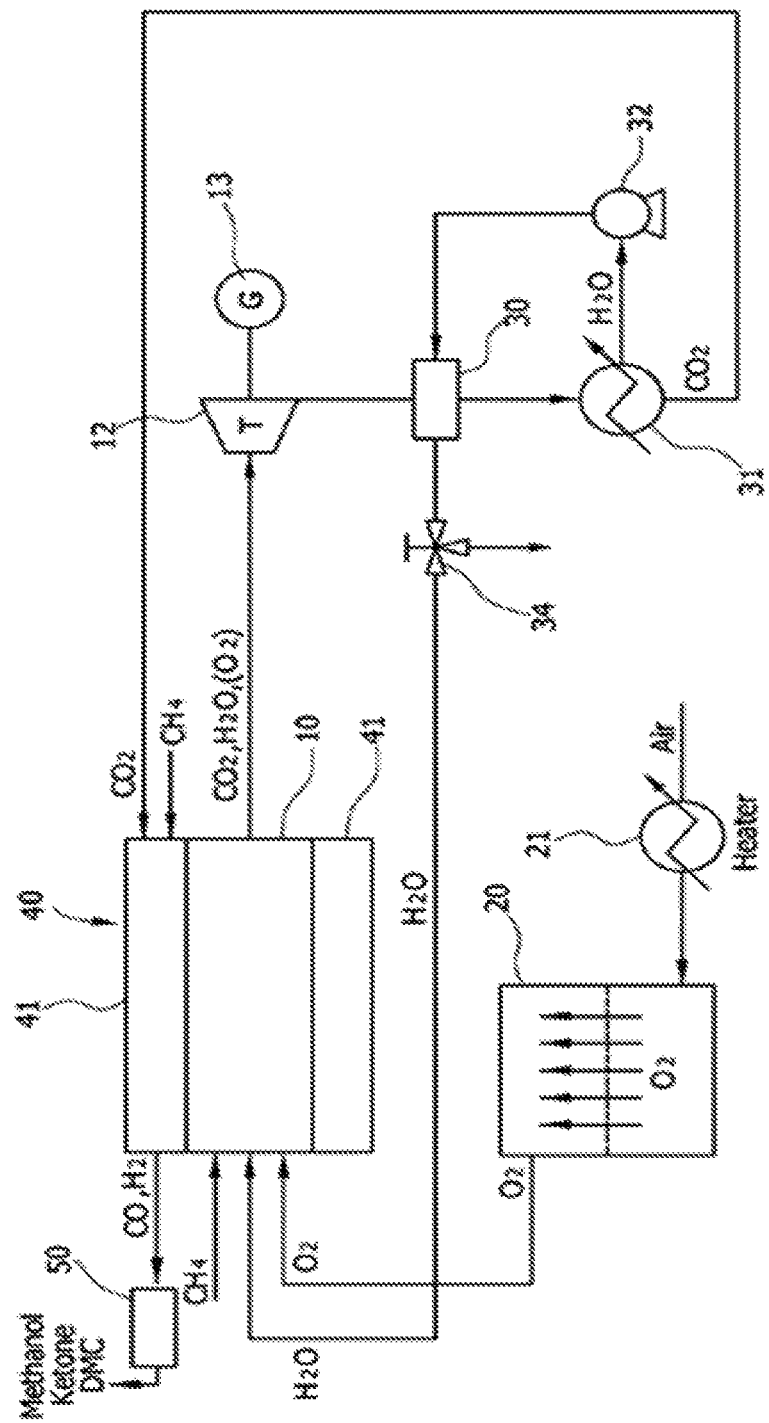

FIG. 6 is a diagram illustrating a configuration of a system according to a fifth exemplary embodiment of the present invention.

[Exemplary Embodiment 5]

The system of the fifth exemplary embodiment includes an ITM 20 that separates oxygen in the air, an integral reactor 40 that includes a dry-reformer 41 that converts a high concentration of carbon dioxide that is generated through an oxy-fuel combustion reaction to synthetic gases CO and $H_2$ at an outer wall of an oxy-fuel combustor 10, and a synthesizer 50 that converts a synthetic gas to methanol.

A conventional oxy-fuel combustor has a high single flame temperature by using oxygen as an oxidizing agent and thus an outer wall of the combustor is damaged, and in order to prevent this, a reaction is performed in a form that lowers combustion temperature by injecting steam. In this case, a heat source for generating steam should exist and separate pump power for driving steam is required, and thus there are problems that a system configuration becomes complex and that entire system efficiency is deteriorated.

Therefore, in the fifth exemplary embodiment, by integrating the dry-reformer 41 at an outer wall of the cylindrical oxy-fuel combustor 10, the integral reactor 40 is introduced to the present system. Thereby, heat that is generated in the oxy-fuel combustor 10 is transferred to the dry-reformer 41 to lower a single flame temperature of the oxy-fuel combustor 10 and thus a quantity of injected steam is reduced, compared with an existing oxy-fuel combustor, and thus power consumption of a pump and heat for generating steam can be reduced such that a configuration of the system may be simplified.

After a reaction of Equation 1, the oxy-fuel combustor 10 discharges carbon dioxide and steam (or oxygen) as an exhaust gas. The discharged exhaust gas drives the turbine 12, and electricity is generated in the generator 13 that is disposed at the same shaft as the turbine 12.

An exhaust gas having passed through a turbine 12 passes through a second heat exchanger 30 and is separated into carbon dioxide and steam by a heater 31. The separated steam is again injected into the second heat exchanger 30 by an air blower 32 and a temperature thereof is raised, and the separated steam is again circulated to the oxy-fuel combustor 10. Before the steam is injected into the oxy-fuel combustor 10, a 3-way valve 34 may adjust a flow rate thereof.

The separated carbon dioxide is supplied to the dry-reformer 41, and the supplied carbon dioxide and a natural gas that is injected from the outside generate a synthetic gas (carbon monoxide, hydrogen) through a dry-reforming reaction of Equation 2.

Carbon monoxide and hydrogen that are generated in the dry-reformer 41 may be converted and synthesized into a useful chemical material or a new fuel such as methanol, ketone, or carbonate via the synthesizer 50.

Due to introduction of the integral reactor 40 that integrates the oxy-fuel combustor 10 and the dry-reformer 41, a configuration of the system can be further simplified.

Figure 7:
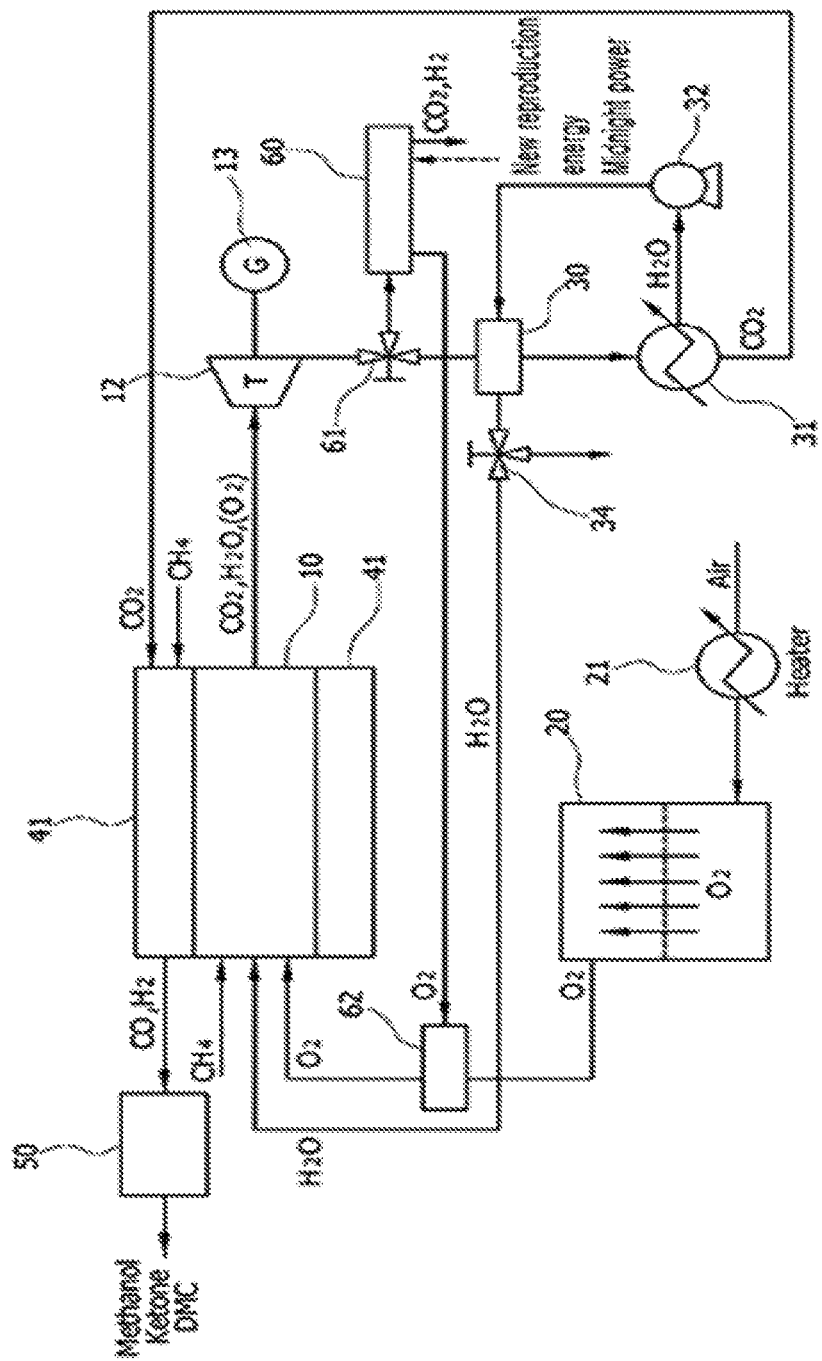

FIG. 7 is a diagram illustrating a configuration of a system according to a sixth exemplary embodiment of the present invention.

[Exemplary Embodiment 6]

The system of the sixth exemplary embodiment further includes a co-electrolysis device 60 that converts carbon dioxide and steam to a synthetic gas and oxygen by applying heat and electrical energy in the foregoing fifth exemplary embodiment.

An exhaust gas, having passed through a turbine 12, is branched to flow while advancing to the co-electrolysis device 60 through a 3-way valve 61 and flow while advancing to a second heat exchanger 30.

The flow advancing to the co-electrolysis device 60 goes through a co-electrolysis process in which carbon dioxide and steam of an exhaust gas are electrolyzed together to be converted into a synthetic gas and oxygen.

Oxygen that is generated in the co-electrolysis device 60 is mixed with oxygen that is separated at an ITM 20 in a mixer 62 to be supplied to an oxy-fuel combustor 10.

Carbon monoxide and hydrogen that are generated in a dry-reformer 41 or the co-electrolysis device 60 may be converted and synthesized into a useful chemical material or a new fuel such as methanol, ketone, or carbonate via a synthesizer 50.

Figure 8:
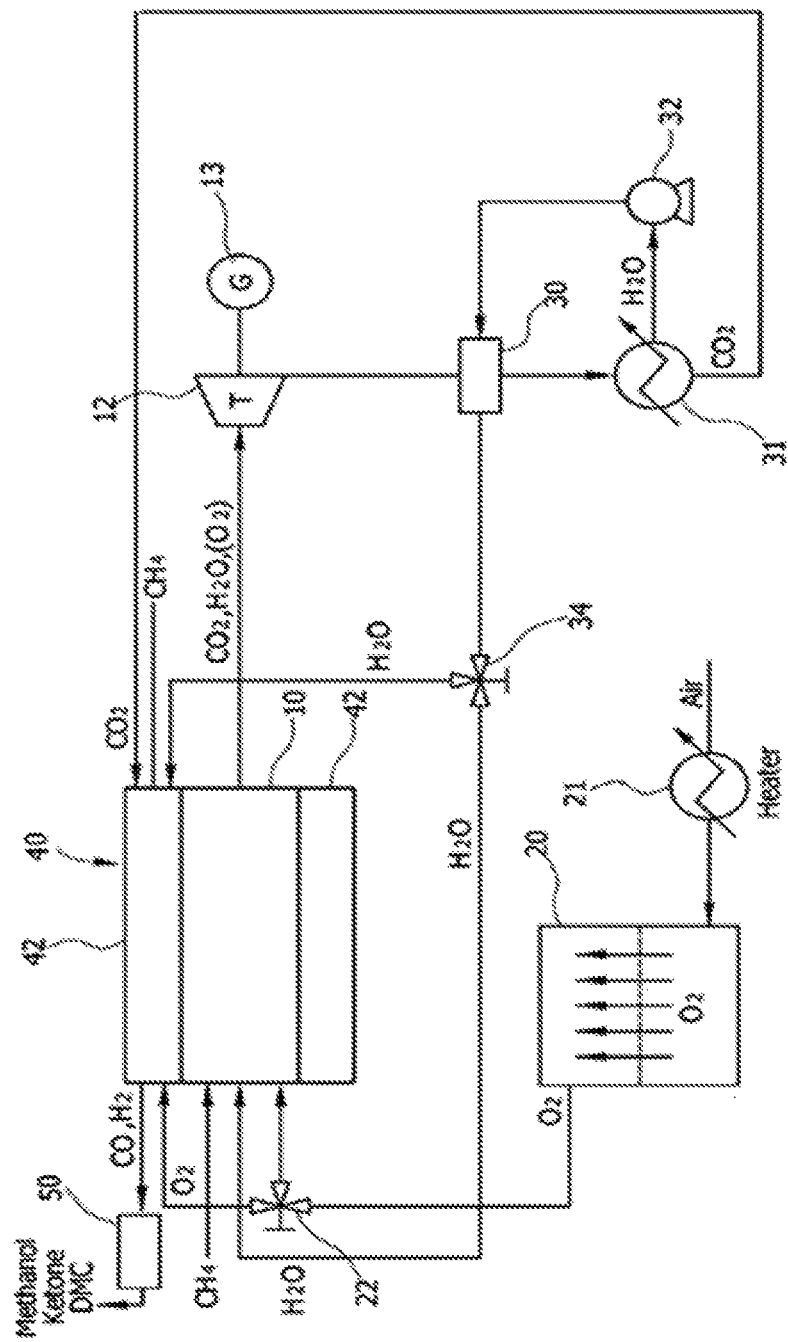

FIG. 8 is a diagram illustrating a configuration of a system according to a seventh exemplary embodiment of the present invention.

[Exemplary Embodiment 7]

The system of the seventh exemplary embodiment includes an ITM 20 that separates oxygen in the air, an integral reactor 40 that includes a tri-reformer 42 at an outer wall of an oxy-fuel combustor 10, and a synthesizer 50 that converts a synthetic gas to methanol.

Oxygen that is separated at the ITM 20 is supplied to the oxy-fuel combustor 10 or the tri-reformer 42 by a 3-way valve 22. By using oxygen that is separated at the ITM 20 as an oxidizing agent, an oxy-fuel combustion reaction is performed in the oxy-fuel combustor 10, and carbon dioxide and steam (or oxygen) are discharged as an exhaust gas.

The discharged exhaust gas drives a turbine 12, and electricity may be generated by a generator 13 that is disposed at the same shaft as the turbine 12.

The exhaust gas having passed through the turbine 12 passes through a second heat exchanger 30, and the exhaust gas having passed through the second heat exchanger 30 is separated into carbon dioxide and steam by the heater 31.

The separated carbon dioxide is supplied to the tri-reformer 42 to perform a tri-reforming reaction that is represented in Equation 3.

The separated steam is again injected into the second heat exchanger 30 by an air blower 32, and steam of which a temperature is raised in the second heat exchanger 30 flows in a direction of the tri-reformer 42 or the oxy-fuel combustor 10. A 3-way valve 34 that adjusts the flow may be further provided.

In the tri-reformer 42, a tri-reforming reaction occurs, and the tri-reformer 42 receives supply of a natural gas that is supplied from the outside, carbon dioxide that is separated at the heater 31, steam having passed through the first heat exchanger, and oxygen that is separated at the ITM 20, and thus a reforming reaction occurs. Unlike a dry-reforming reaction that is illustrated in the fifth and sixth exemplary embodiments, a tri-reforming reaction additionally requires supply of steam and oxygen, and thus the flow of the present system is formed.

Carbon monoxide and hydrogen that are generated in the tri-reformer 42 may be converted and synthesized into a useful chemical material or a new fuel such as methanol, ketone, or carbonate via the synthesizer 50.

Figure 9:
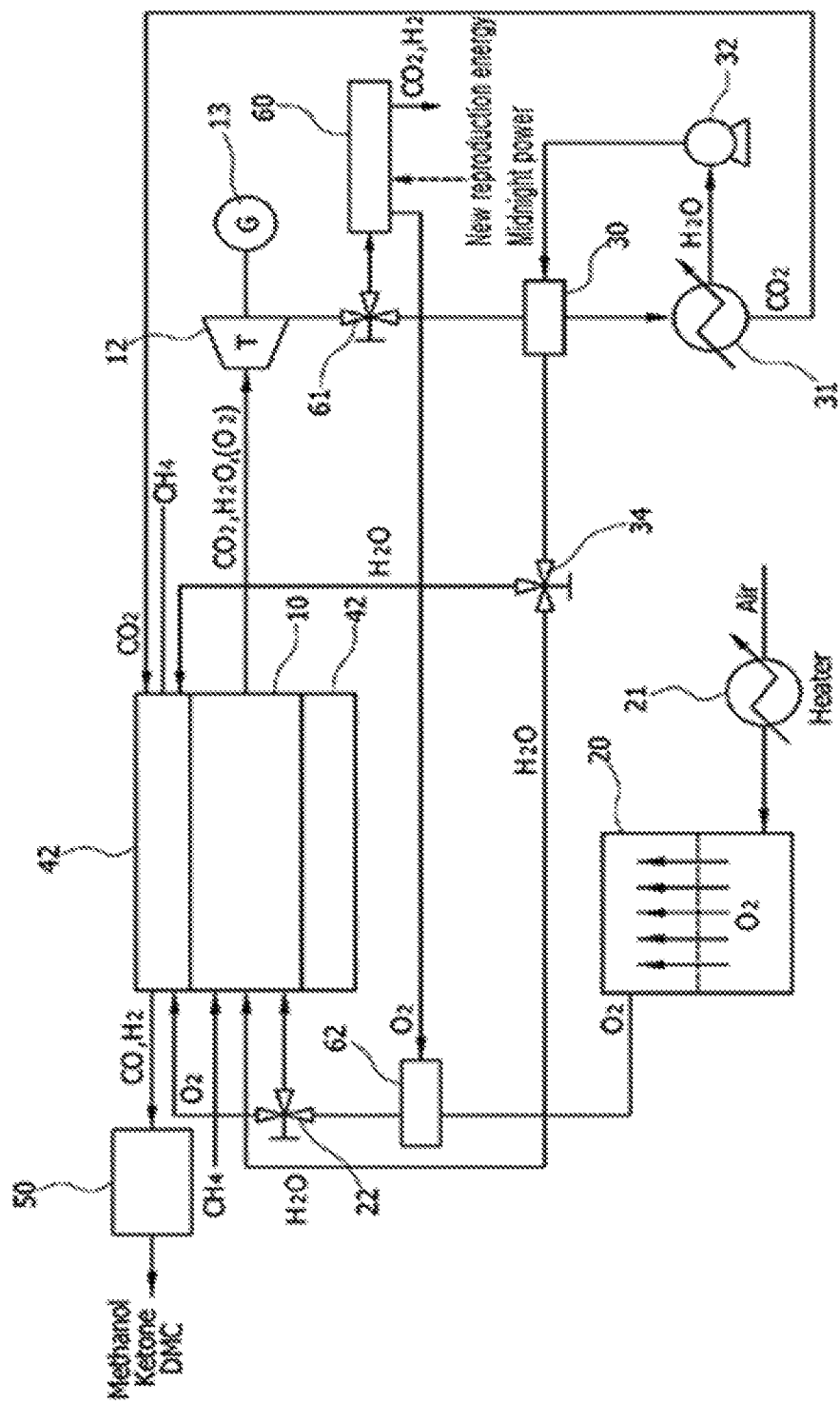

FIG. 9 is a illustrating a configuration of a system according to an eighth exemplary embodiment of the present invention.

[Exemplary Embodiment 8]

The system of the eighth exemplary embodiment further includes a co-electrolysis device 60 that converts carbon dioxide and steam into a synthetic gas and oxygen by applying heat and electrical energy in the foregoing seventh exemplary embodiment.

An exhaust gas having passed through a turbine 12 is branched to flow while advancing from a 3-way valve 61 to a second heat exchanger 30 and flow while advancing to the co-electrolysis device 60.

The flow advancing to the co-electrolysis device 60 goes through a co-electrolysis process in which carbon dioxide and steam of an exhaust gas are electrolyzed together to be converted into a synthetic gas and oxygen.

Oxygen that is generated in the co-electrolysis device 60 is mixed with oxygen that is separated at an ITM 20 in a mixer 62, and is supplied to an oxy-fuel combustor 10 or a tri-reformer 42 by a 3-way valve 35.

Carbon monoxide and hydrogen that are generated in the tri-reformer 42 or the co-electrolysis device 60 may be converted and synthesized into a useful chemical material or a new fuel such as methanol, ketone, or carbonate via a synthesizer 50.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. The scope of the present invention should be analyzed by the appended claims, and all changes, modifications, and alterations should be seen as within the scope of the present invention.

INDUSTRIAL APPLICABILITY

According to a carbon dioxide conversion system of the present invention, from an oxygen production viewpoint, compared with an ASU that separates oxygen in the air using an ITM, an oxygen production cost is reduced and thus system efficiency is improved.

Because a synthetic gas that is converted in a reformer can be converted and synthesized into a useful compound material or new fuel such as methanol, ketone, or carbonate via an additional process, there is a merit that the system can have various uses.

In a carbon dioxide conversion system according to the present invention, by integrating and producing a tri-reformer or a dry-reformer at an outer wall of an oxy-fuel combustor, heat that may damage the outer wall of the oxy-fuel combustor may be transferred to the tri-reformer or the dry-reformer and thus inflow of steam is unnecessary or a quantity thereof may be reduced, such that energy consumption for generating and driving steam can be reduced.

Further, by improving a transfer rate of heat that is supplied to the tri-reformer or the dry-reformer, a synthetic gas conversion rate can be improved.

In addition, a synthetic gas can be converted and synthesized to a new fuel or a useful compound material using midnight power or surplus power and heat energy from new reproduction energy, and thus the system can have various uses.

The invention claimed is:

1. A carbon dioxide conversion system, comprising:
   an ion transfer membrane configured to separate oxygen in the air;
   an oxy-fuel combustor connected to the ion transfer membrane and configured to combust a natural gas supplied from the outside using the oxygen that is separated at the ion transfer membrane as an oxidizing agent;
   a tri-reformer connected to the ion transfer membrane and the oxy-fuel combustor;
   a turbine connected to the oxy-fuel combustor and configured to be supplied with exhaust gas discharged from the oxy-fuel combustor, and
   a heater connected between the turbine and the tri-reformer, and configured to separate carbon dioxide and steam from the exhaust gas having passed through the turbine, and
   wherein the tri-reformer is configured to be supplied with the carbon dioxide and the steam separated from the exhaust gas, and
   the tri-reformer is configured to convert the carbon dioxide and the steam that are separated at the heater, methane gas that is supplied from the outside, and the oxygen that is separated at the ion transfer membrane to carbon monoxide and hydrogen by a tri-reforming reaction.

2. The carbon dioxide conversion system of claim 1, further comprising a co-electrolysis device connected to the oxy-fuel combustor and configured to convert the carbon dioxide and the steam that are generated through an oxy-fuel combustion reaction of the oxy-fuel combustor by applying heat and electrical energy to carbon monoxide, hydrogen, and oxygen.

3. The carbon dioxide conversion system of claim 2, further comprising a synthesizer installed at the rear end of the tri- reformer and configured to convert the carbon monoxide and the hydrogen that are generated in the tri-reformer or the co-electrolysis device to methanol, ketone, or carbonate.

4. The carbon dioxide conversion system of claim 2, further comprising:
   a mixer connected to the co-electrolysis device and the ion transfer membrane, and configured to mix the oxygen that is generated in the co-electrolysis device and the oxygen that is separated at the ion transfer membrane; and
   a 3-way valve connected to the mixer, the oxy-fuel combustor and the tri-reformer, and configured to supply oxygen from the mixer to the oxy-fuel combustor or the tri-reformer.

5. The carbon dioxide conversion system of claim 1,
   wherein the steam separated from the exhaust gas that is discharged from the oxy-fuel combustor is supplied to the oxy-fuel combustor.

6. The carbon dioxide conversion system of claim 5, further comprising a 3-way valve connected to the oxy-fuel combustor and the tri-reformer, and configured to adjust a flow rate of steam that is supplied to the tri-reformer and the oxy-fuel combustor.

* * * * *